United States Patent [19]

Schmiedeke

[11] 4,029,459
[45] June 14, 1977

[54] METHOD AND APPARATUS FOR MANUFACTURE OF GRANULATES FROM PULVERULENT, GRANULAR, DOUGHY OR SIMILAR MATERIAL

[75] Inventor: Jürgen Schmiedeke, Lage, Germany

[73] Assignee: Gunther Papenmeier KG, Mashinen-und Apparatebau, Detmold, Germany

[22] Filed: Jan. 20, 1975

[21] Appl. No.: 542,555

[30] Foreign Application Priority Data

Feb. 1, 1974   Germany ............... 2404813

[52] U.S. Cl. ............ 425/202; 259/3; 259/195; 425/331; 425/335; 425/DIG. 230; 425/365
[51] Int. Cl.² ............ B29B 1/04
[58] Field of Search ......... 425/331, 314, 362, 335, 425/DIG. 230, 202, 192; 259/3, 15, 84, 185, 191, 193, 195

[56] References Cited

UNITED STATES PATENTS

| | | | |
|---|---|---|---|
| 2,700,940 | 2/1955 | Johnson | 425/331 X |
| 3,167,033 | 1/1965 | Kuhn | 425/192 |
| 3,245,110 | 4/1966 | Danbenfeld | 259/191 |
| 3,490,390 | 1/1970 | Du Toit | 425/192 |

FOREIGN PATENTS OR APPLICATIONS

| | | | |
|---|---|---|---|
| 562,186 | 8/1958 | Canada | 425/331 |
| 1,101,374 | 3/1961 | Germany | 425/362 |
| 972,903 | 10/1959 | Germany | 425/362 |

*Primary Examiner*—Francis S. Husar
*Assistant Examiner*—William R. Briggs
*Attorney, Agent, or Firm*—Strauch, Nolan, Neale, Nies & Kurz

[57] ABSTRACT

Method and various embodiments of apparatus for producing granulates from pulverulent, granular, doughy or similar material. Material to be granulated is continuously fed into the apparatus and formed into a skin of the material in the nip spaces between adjacent and cooperating rotating curved surfaces. The skin and material alternately progresses and is moved backwards axially of the rotating surfaces and is periodically and repeatedly kneaded as it is conveyed by the rotating surfaces towards and away from and finally forced through outlet apertures whereupon it is divided up into granulates. The apparatus can be in various embodiments which use paired, skinforming rotating curved surfaces and can be the surfaces of rollers or of at least two rollers cooperating with the internal surface of a drum. Helical lands or grooves can be incorporated in one or a combination of the paired rotating surfaces.

17 Claims, 3 Drawing Figures

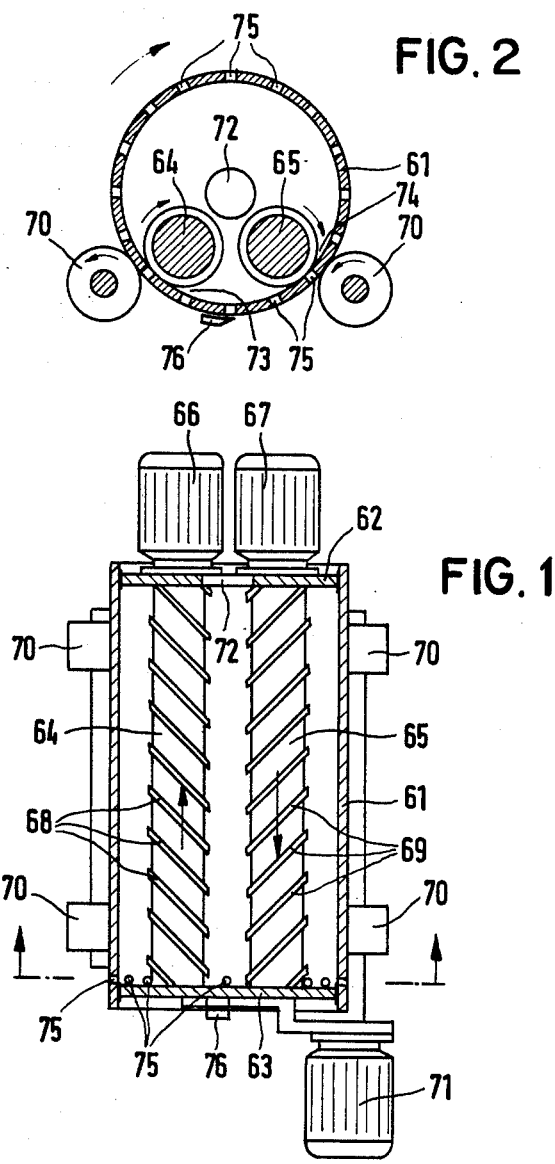

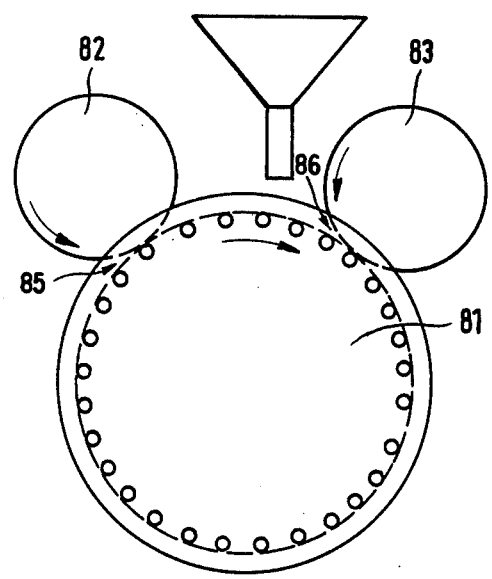

METHOD AND APPARATUS FOR MANUFACTURE OF GRANULATES FROM PULVERULENT, GRANULAR, DOUGHY OR SIMILAR MATERIAL

CROSS-REFERENCE TO RELATED APPLICATION

A related application Ser. No. 512,871, filed Oct. 7, 1974 by Horst Bremer and directed to METHOD AND APPARATUS FOR MANUFACTURE OF GRANULATES FROM PULVERULENT GRANULAR, DOUGHY OR SIMILAR MATERIAL, is co-pending with and is owned by the assignee of this application. The invention herein is directed to a novel improvement of the method and apparatus disclosed and claimed in the aforedescribed application, the disclosure of which, to the extent necessary for any details thereof is incorporated herein by reference thereto.

BACKGROUND OF THE INVENTION

The invention relates to a method and devices for producing granulates from pulverulent, granular, doughy or similar material, more particularly plastics, in which the material to be granulated is formed into a skin between rotating curved surfaces, for instances, of rollers, the skin form of material eventually being divided into granulates.

Many different types of methods and devices for the manufacture of granulates are known. For instance, German Patent Specification No. 972,903 discloses an apparatus for granulating pulverulent, pasty or doughy materials, the apparatus including a cylindrical or conical tube formed with sieve-like perforations and utilizing a conveyor or press screw. One or more rotary blades are guided along the sieve surface to divide up the extruded mouldings. The material to be granulated is conveyed by means of a conveyor screw into the granulating apparatus. If suitably constructed, the conveyor screw can precompact the material. By means of a pressure roller formed with corresponding conveying grooves, the material is forced directly, without any definable kneading, through the moulding apertures and then divided into granulates by means of the rotating blades. There is neither the possibility nor the intention of compacting or compressing the material before granulation, for instance, to eliminate any gases which may be enclosed or to make sure that the material is satisfactorily homogenized.

Granulating apparatuses are also known, for instance, from German Auslegeschrift No. 1,242,846, in which the material to be granulated is granulated not immediately after being fed into the apparatus, but only after a suitable compacting phase. However, the phase is much too short, since the material is compacted only at the point of contact of the moulding rollers. The material to be granulated is compacted to some extent, in dependence on its texture, but not adequately homogenized during compacting.

SUMMARY OF THE INVENTION

It is a primary object of the present invention to provide an improved method and apparatus for the manufacture of granulates of the kind specified, in which the material to be granulated is satisfactorily compacted and homogenized to the greatest possible extent before being divided into granulates. According to the inventive aspects covered in the aforedescribed co-pending U.S. application Ser. No. 512,871 the material is continuously fed to an arrangement of cooperating rollers and is periodically and repeatedly kneaded in the axial direction of the rollers and over their whole length, without material being removed, the material being further conveyed, with rotation of the rollers, in the roller nip in the axial direction towards the outlet apertures, forced through such outlet apertures and at the same time divided up into granulates. This present invention provides improvements in the method and apparatus and provides a more complete and thorough homogenizing by making the material undergo alternating directions of movement toward and away from the outlet apertures before being forced through the outlet apertures and divided into granules. Thus the material may progress in the direction in pilgrim step fashion, the material being alternately moved towards and away from the outlet apertures, the backward movement of the material being smaller than each preceding forward movement. The use of this method has the advantage that different throughputs and at the same time particular desired compacting and/or homogenization effects can be achieved with an apparatus of one size.

It has been found that the method according to the present invention produces substantially better results than the prior are method conventionally used. The resulting products are of much superior quality and at least equal to the known extruder granulate. Due to the reduced installation and operational costs, the granulates can be produced at a substantially more economic price.

Further objects of the invention reside in devices used for the performance of the method according to the present invention, having at least three relatively rotatable members with cooperating curved surfaces providing at least two nips, two of the members being adapted and arranged, when relatively rotating, to knead the material repeatedly as a thin layer in one of the nips and by the interaction of the relatively rotating curved surfaces at that nip to move the material axially along the members, there further being provided outlet apertures towards which the material is axially moved as aforesaid and means to divide material, when it is eventually forced through the outlet apertures, into granulates. In order to achieve movement of the material both towards and away from the outlet apertures in accord with the present invention, the third rotatable member, having a curved surface, provides a second nip by cooperation of its curved surface with the curved surface of a first one of the other two members, the third member being rotatable relative to said first member and being adapted and arranged, when so rotating, to knead the material as a thin layer in its associated nip and to move the material axially along the said first member in the opposite direction to the movement of the material by the second of the said other two members. The arrangement can be that, as the material to be granulated passes through the first roller nip the material is moved in one direction towards the outlet apertures and when it passes the second roller nip it is moved backwards by a predetermined amount. Care must be taken that the forward movement of the material toward the outlets is greater than the backward movement thereof in the opposite direction. As a result the material to be granulated can be more intensively kneaded and better homogenized. To this end the second and third members may have profilings of opposite hands or may be of different pitches.

The members are relatively rotatable so that their curved surfaces have opposite directions of movement at the nips, the relative speeds of rotation being adjustable.

The rotating and cooperating curved surfaces which are to form a skin from the material to be processed into a granulate, are paired, in that either a concavely curved surface is disposed adjacent a convexly curved surface, or two convexly curved surfaces are disposed adjacent one another. Thus, as a practical matter the devices can include either roller within a drum rollers cooperating with the outer surface of a drum or large roller, the various cooperating surfaces forming nips therebetween. The helical profilings are disposed on the inner surface of a drum or on the outer surface of the rollers either on one of the surfaces or, if necessary, on both of cooperating surfaces.

In dependence on the particular use in view, the most convenient forms of the apparatus can be developed having regard to the aforementioned criteria, to give the material to be granulated the optimum treatment as it passes through the apparatus, so that the granulate is obtained in the best possible form and consistency. Due to the various versatile shapes in which the granulating devices can be constructed, the processing of the materials to be granulated can be influenced, and more particularly, even within a particular embodiment of the apparatus the throughput and degree of compacting and homogenization can be adjusted within relatively wide limits, so that an apparatus of the kind specified can be used virtually universally for different materials.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings, in which:

FIG. 1 is a horizontal section through a granulating apparatus embodying the invention having a horizontal driven drum within which two nip-forming driven rollers are disposed;

FIG. 2 is a radial section taken on line 2—2 through the granulating apparatus illustrated in FIG. 1; and FIG. 3 is a diagrammatic view of a granulating apparatus operated in a manner similar to the illustrated in FIGS. 1 and 2, but having two nip forming rollers disposed adjacent the outer surface of a rotating drum.

GENERAL DESCRIPTION OF INVENTION IN CO-PENDING APPLICATION

In the granulating apparatus described and claimed in co-pending application Ser. No. 512,871 a basic form of apparatus has a frame which mounts supporting rollers which rotatably support and, if desired, provide driving force for a drum. Disposed in the drum on a parallel axis is a cylindrical roller mounted by vertically adjustable bearings in the frame. The cylindrical surface of the roller cooperates with the inner cylindrical surface of the drum to form a roller nip or narrow space through which the material to be granulated is forced in order to form a skin on the inner surface of the drum. The inner surface of the drum has a helical profiling extending from the end adjacent which a feed device is disposed to the opposite end where outlet apertures for the granulate are provided in the drum. The outlet apertures are disposed in the transitional zone between the cylindrical surface of the drum and an inwardly directed flange-like end periphery thereof. Attached on the frame closely adjacent the outside of the exit end of the drum is a blade which, when the drum rotates, serves to cut off the material passing through the outlet apertures, so that the granulate occurs and is deposited in the proper sizes. The granulating apparatus and the cylindrical rollers are driven by an electric motor and, if desired, via a variable speed gearing.

During operation of the granulating apparatus described in the preceding paragraph the material to be granulated is fed into one end of the nip between the drum and the roller. The material is compacted and as it passes the nip forms as a skin which adheres to the inner wall of the drum. As it passes the roller nip, the compacting and kneading of the material (or skin) causes it to be displaced in an axial direction toward the outlet apertures at the other end of the drum due to the action by the helical profiling on the inner surface of the drum. Such a cylindrical roller can have a smooth surface or it can also have helical or the like profilings (lands or grooves) and in dependence on their shape, i.e., if the helical lead varies, the axial movement of the material can be accelerated or decelerated in its travel toward the apertures. Instead of a drum and a roller, two cooperating rollers, (one can be hollow) can be rotatably mounted in a frame with the nip occurring between the two rollers. One roller can be made with two helical profilings, one right and one left hand, extending towards the central plane of the roller. A material feed assembly can be used at each end of the roller nip and disposed in the central plane of the hollow roller are radial apertures through which the material to be granulated, which will be moved from the outer ends of the roller to its center, is forced inwards into the inside of the roller. A blade cuts the granulate off, and it drops into the inside of a hollow shaft on which the hollow roller is rotatably mounted. The granulate can be removed by suitable means, e.g., compressed air or suctional air. A drive motor drives the rollers. The width of the roller nip between the two rolling units can be adjusted by means of adjusting screws. The roller axes can be skewed and one or both rolling surfaces contoured accordingly.

DESCRIPTION OF THE PREFERRED EMBODIMENTS OF THE PRESENT INVENTION

The present invention utilizes aspects of the invention in the afore-described co-pending application in utilizing roller nips, helical profiling, feeding and progressing the compacted material in skin form as it passes through the roller nip toward apertures where the material is extruded and cut into granulate form. Over and above the foregoing, the present invention constitutes a substantial improvement by providing the capability of increased kneading and compacting of the material realized by moving material past at least two circumferentially spaced nip zones and as it passes the nip zones, gradually causing the material to progress toward outlet apertures. The amount of axial movement of the compacted skin of material as it passes one nip zone can be different from the amount and even the direction of axial movement of the skin as it passes another nip zone.

Turning now to the illustrated devices, the granulating apparatus illustrated in FIG. 1 and 2, comprises a rotatably mounted hollow drum 61 closed at its ends by non-rotatable walls 62,63 which are secured to supporting structure (not shown). Rotatably journalled in and extending between the spaced apart end walls 62,63 are two rollers 64,65 which are driven independently by means of two electric motors 66,67. Each of the two rollers 64,65 has on its outside surface a helical profiling 68,69, the pitch of one being to the opposite hand of the pitch on the other. Drum 61 has a close running fit with the end walls and is mounted on running rollers 70 which through appropriate gearing are driven by an electric motor 71 to in turn rotate the drum. The end wall 62 is formed with a central aperture 72 through which the material to be granulated is introduced (fed) into the drum 61.

When drum 61 rotates clockwise (as viewed in FIG. 2), the material introduced first passes into the roller nip 73 between drum 61 and roller 64, where it is compacted and forced, in the form of a skin, against the inside of the drum 61. If desired, the drum wall can also have a surface profiling. When the drum 61 rotates, the skin formed on its inside wall is carried into the second roller nip 74 between the drum 61 and the roller 65. The helical profiling 69 of the roller 65 ensures that the material to be granulated is displaced by a predetermined amount towards the end wall 63. Then the skin moves on and into the roller nip 73, in which it is displaced by the profiling 68 of the roller 64 with opposite pitch towards the end wall 62. The lead of the profiling 68 on roller 64 is less than that on roller 65 so the amount of such backward displacement of the material to be granulated is smaller than the amount of the forward movement by roller 65 in the direction of the end wall 63. As a result, the material to be granulated is several times moved backwards and forwards as it progresses along the drum 61 from the inlet side in the direction of the outlet side, the material being subjected to an intensive compacting and kneading processing, more particularly in the roller nip 73, 74 to improve its homogenization.

When the material to be granulated finally reaches the end wall 63, it is then forced out through the aperture 75 in the wall of drum 61, to be cut off by a blade 76 which is disposed adjacent the drum and maintained fixed as by means securing it to the supporting frame of the apparatus.

Since the drum 61, and also the rollers 65,64 can be driven independently of one another by the electric motors 71, 66, 67, the granulating apparatus can be operated in many different ways and adjusted within wide limits. The speed and direction of rotation of each of the driven parts can be independently adjusted. The granulating apparatus can therefore be adapted in an optimum manner to any particular material to be granulated. Both the compacting and therefore the degree of homogenization, and also the throughputs can be varied as required.

The granulating apparatus shown diagrammatically in FIG. 3 is constructed in and operates with a principle similar to that described in conjunction with FIGS. 1 and 2, except that in FIG. 3 the hollow drum is replaced by a large roller 81 with which the two rollers 82,83 cooperate, as is the case in the apparatuses illustrated in FIGS. 1 and 2. Care must merely be taken that the skin of the material for granulation formed between the roller nips 85 and 86 remains sticking to the surface of roller 81; this can be done by suitable profiling of the surfaces of the three rollers 81, 82, 83. The outlet end of the drum 81 can include a flange 87 which includes outlet apertures 88 through which the material extrudes and is cut off in granulates by a fixed knife. This granulating apparatus operates in a similar manner to that of FIGS. 1 and 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to the embraced therein.

What is claimed and desired to be secured by Letters Patent is:

1. Apparatus for producing granulates from pulverulent, granular, doughy or similar material, such as plastics, comprising: a plurality of members including means having closely adjacent but spaced apart rotating curved surfaces, providing an elongate nip zone where the rotating surfaces are approaching each other; means adjacent one of said curved surfaces for continuously feeding material into one portion of said nip zone; said rotating surfaces having surface formations structured to provide, at said zone, periodic and repeated kneading action on the material causing it to be formed as a skin and conveyed in the axial direction and along the length of the adjacent portions of the rotating surfaces; additional means, including one of said rotating surfaces, for receiving the material after a passage through said nip zone and structured so as to convey the material in the opposite direction as a skin on one of the rotating surfaces; means providing apertures in at least one of said members adjacent said nip zone and spaced axially from said portion of said nip zone where material is fed, said rotating structured surface formations providing a force on and, after alternate directions of movement of said material, causing kneaded material to pass through said apertures; and means located at the exit side of said apertures for granulating the material extruded from said apertures.

2. Apparatus as defined in claim 1, wherein the surface formation of at least one of said rotating surfaces has at least one helical profiling, at one end of which the feeding means for the material to be granulated is disposed, and said material outlet apertures being disposed at the other end of said helical profiling.

3. Apparatus as defined in claim 1, wherein at least one of said rotating curved surfaces is the surface of a roller.

4. Apparatus as defined in claim 3, wherein one of said rotating curved surfaces is the surface of a hollow drum device.

5. Apparatus as defined in claim 4, wherein the surface formations of at least one of said surfaces has at least one helical profiling, at one end of which the feeding means for the material to be granulated is disposed, and said material outlet apertures being disposed at the other end of said helical profiling.

6. Apparatus as defined in claim 5, wherein the surface with the helical profiling is the roller surface.

7. Apparatus as defined in claim 5, wherein the surface with the helical profiling is the inner surface of said drum.

8. Apparatus as defined in claim 1, wherein at least three different rotating surfaces are provided and cooperate to form two nips arcuately spaced apart and adjacent one of the rotating surfaces.

9. Apparatus as defined in claim 8, wherein profiling is provided on at least two of said surfaces and said profilings on one surface have a pitch different from that on the other surface.

10. Apparatus as defined in claim 9, wherein both profiled surfaces are formed on rollers.

11. Apparatus as defined in claim 10, wherein the axes of said rollers are parallel.

12. Apparatus as defined in claim 8, wherein means are provided for rotating said means with rotating surfaces.

13. Apparatus as defined in claim 12, wherein said rotating means drives one of said rotating surfaces at a different speed from another of said rotating surfaces.

14. Apparatus as defined in claim 8, wherein two surfaces are the outer surface of two rollers and one surface is the surface of a drum with which the roller surfaces cooperate to provide two nips.

15. Apparatus as defined in claim 14, wherein the surface of said drum is the exterior drum surface.

16. Apparatus as defined in claim 14, wherein the surface of said drum is the interior drum surface.

17. Apparatus as defined in claim 14, wherein helical profiling of different pitch are provided on the two roller surfaces.

* * * * *

UNITED STATES PATENT AND TRADEMARK OFFICE
CERTIFICATE OF CORRECTION

PATENT NO. : 4,029,459
DATED : June 14, 1977
INVENTOR(S) : JURGEN SCHMIEDEKE

It is certified that error appears in the above-identified patent and that said Letters Patent are hereby corrected as shown below:

Column 1, line 24, change "instances" to --instance--.

Column 3, line 11, line 11 should read --devices can include either rollers within a drum or rollers--.

Column 3, line 48, change "the" to --that--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*